(12) United States Patent
Seo

(10) Patent No.: US 7,984,346 B2
(45) Date of Patent: Jul. 19, 2011

(54) INTEGRATED APPARATUS FOR TESTING IMAGE DEVICES

(76) Inventor: Byeongil Seo, Seoul (KR)

( * ) Notice: Subject to any disclaimer, the term of this patent is extended or adjusted under 35 U.S.C. 154(b) by 1303 days.

(21) Appl. No.: 11/552,473

(22) Filed: Oct. 24, 2006

(65) Prior Publication Data

US 2007/0132850 A1 Jun. 14, 2007

(30) Foreign Application Priority Data

Nov. 10, 2005 (KR) ........................ 10-2005-0107367

(51) Int. Cl.
*G01R 31/28* (2006.01)
(52) U.S. Cl. .......... 714/724; 714/25; 714/740; 714/742; 348/180; 348/187
(58) Field of Classification Search .................... None
See application file for complete search history.

(56) References Cited

U.S. PATENT DOCUMENTS

| 6,847,395 | B2 * | 1/2005 | Thomas et al. | ............... | 348/180 |
| 7,050,090 | B2 * | 5/2006 | Brodigan | ...................... | 348/180 |
| 7,629,998 | B2 * | 12/2009 | Elberbaum | ................... | 348/187 |
| 2002/0036631 | A1 * | 3/2002 | Perez | ............................ | 345/204 |
| 2003/0142374 | A1 * | 7/2003 | Silverstein | .................... | 358/504 |
| 2005/0099362 | A1 * | 5/2005 | Howell | ........................... | 345/10 |

* cited by examiner

*Primary Examiner* — John P Trimmings
(74) *Attorney, Agent, or Firm* — IPLA P.A.; James E. Bame

(57) ABSTRACT

An integrated apparatus for testing image devices is disclosed, in which a plurality of testing apparatuses needed when an image-related device is installed are integrated into one construction for thereby achieving a good portability as compared to a conventional art in which a plurality of testing apparatuses such as a multi-meter, a portable monitor, a communication tester, etc. are separately needed.

5 Claims, 2 Drawing Sheets

INTEGRATED APPARATUS FOR TESTING IMAGE DEVICES

CROSS REFERENCE

Applicant claims foreign priority under Paris Convention and 35 U.S.C. §19 to a Korean Patent Application No. 10-2005-0107367, filed Nov. 10, 2005 with the Korean Intellectual Property Office.

TECHNICAL FIELD

The present invention relates to a testing apparatus needed when a CCTV and image-related devices are installed, and in particular to an integrated apparatus for testing image devices in which a plurality of testing apparatuses needed when an image-related device is installed are integrated into one construction for thereby achieving a good portability as compared to a conventional art in which a plurality of testing apparatuses such as a multi-meter, a portable monitor, a communication tester, etc. are separately needed.

BACKGROUND ART

Generally, a CCTV (Closed Circuit Television) is referred to a television transmission system which has been used in an industry field such as a common industry, education field, medical field and local information service field and is called as an industry television (ITV) or an exclusively dedicated television. Since it uses a wired or special wireless transmission path from a transmission side to a receiving side, a common person cannot use the above system. So, the above system has been generally installed for a special purpose.

When a CCTV is installed, a precise test should be performed based on a transmission efficiency between a transmission side to a receiving side for thereby achieving a desired installation purpose.

For example, when a certain security area is needed to be monitored, it is possible to achieve a desired object of a monitoring system only when a certain condition such as an efficiency of an entire transmission and receiving system and a noise is controlled within a certain condition range(resolution, noise level, audibility, etc.)

In the conventional art, an installation worker should carry a plurality of testing apparatuses such as a multi-meter, a portable monitor, a communication tester, etc. and performs an installation work in an indoor or outdoor environment, so that it is very inconvenience to carry the above system, and a test apparatus may be easily damaged.

DISCLOSURE OF THE INVENTION

Accordingly, it is an object of the present invention to provide an integrated apparatus for testing image devices which overcomes the problems encountered in the conventional art.

It is another object of the present invention to provide an integrated apparatus for testing image devices in which a plurality of testing apparatuses needed when an image-related device is installed are integrated into one construction for thereby achieving a good portability as compared to a conventional art in which a plurality of testing apparatuses such as a multi-meter, a portable monitor, a communication tester, etc. are separately needed.

To achieve the above objects, there is provided an integrated apparatus for testing image devices which comprises an image level measuring circuit which is connected with a transmission and receiving path of a video signal and receives a video signal from the transmission side and detects a level of a corresponding video signal; an A/D converter which converts a signal detected by the image level measuring circuit into a digital signal and selectively provides in accordance with a control signal; a communication test circuit which measures whether a data communication between the transmission side and the receiving side is normally performed or not through a wired data transmission path; a text display circuit which is connectable with a video signal path between the transmission side and the receiving side and inserts a certain text data into a corresponding signal in accordance with a control signal or detects an inserted text data and regularly provides to the receiving signal; a monitor which displays a text inserted or detected through the text display circuit or a text generated by a control signal which controls the text display circuit; a key pad with which a worker or a user inputs a certain command or a text; and a main controller which checks and judges a certain error during a flow of a signal through the communication test circuit based on a user's request inputted through the key pad, evaluates a detection signal inputted through the A/D converter based on a previously set standard, and displays a result of the test and other test states on the monitor by controlling the text display circuit.

As an additional feature of the integrated apparatus for testing image devices according to the present invention, a UTP (Unshielded Twisted Pair) cable measuring circuit is connected with a signal input side of the A/D converter for detecting an error based on a short circuit of a cable when it is needed to connect using a UTP.

As another additional feature of the integrated apparatus for testing image devices, the monitor is formed of a TFT device.

As further another additional feature of the integrated apparatus for testing image devices, the text display circuit is provided with a video signal input function and a video signal output function and is used for both the NTSC and PAL methods irrespective of a TV method.

According to the technical concepts of the present invention, a service monitor function is added to a multi-tester which is a necessary item of an electronic engineer, and a multi-meter function is added to a service monitor, so that a user can easily carry and use the integrated system.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The preferred embodiments of the present invention will be described with reference to the accompanying drawings.

Figure 1:
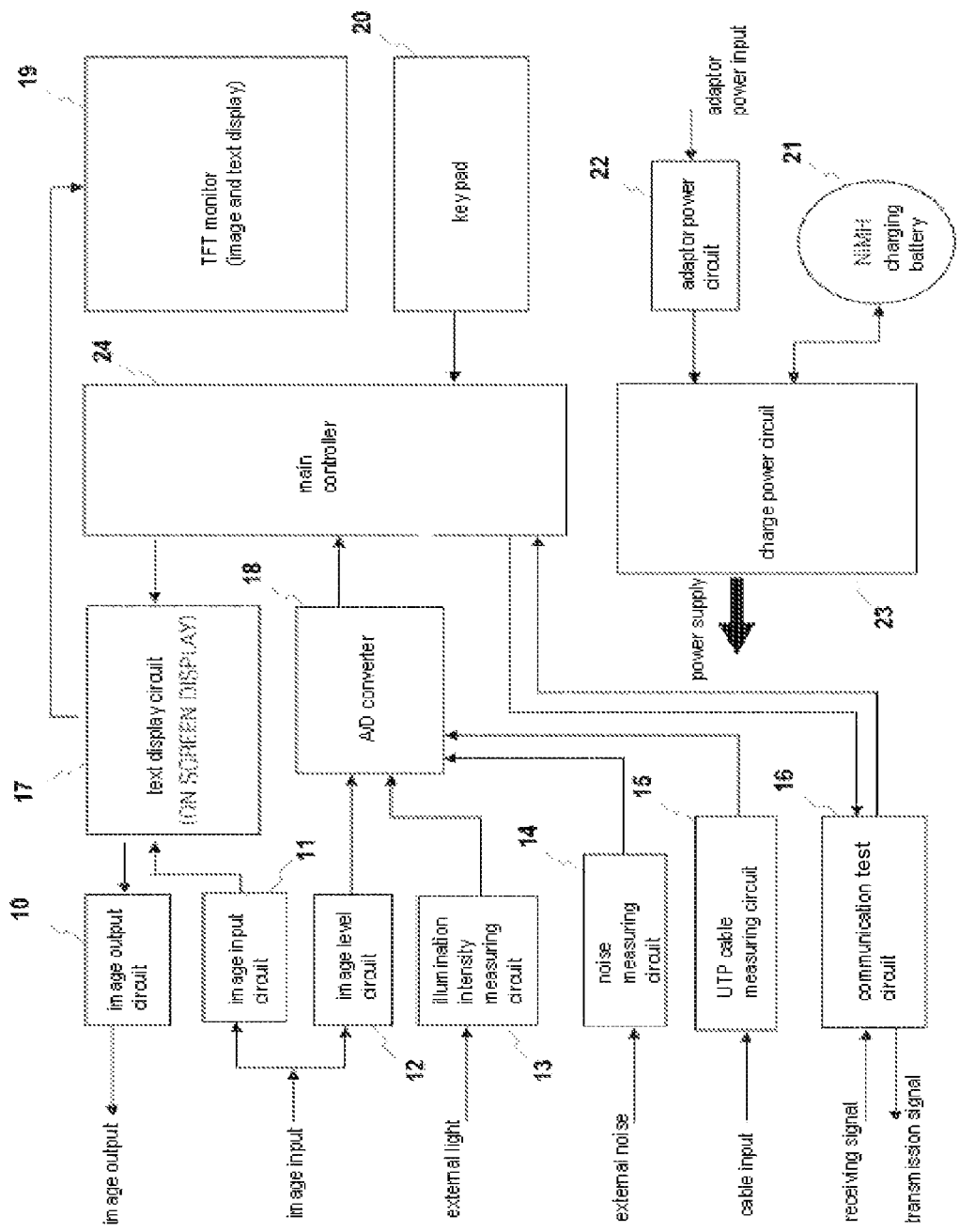
FIG. 1 is a block diagram illustrating an integrated apparatus for testing image devices according to the present invention.
Figure 2:
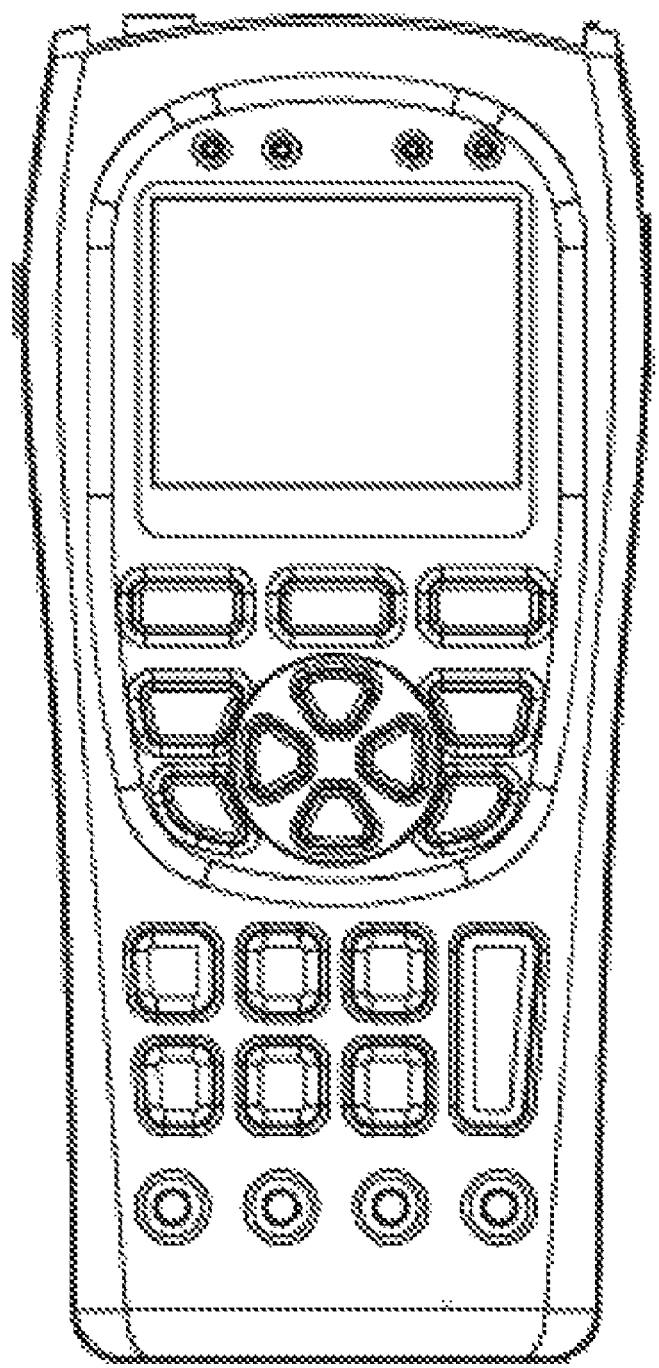
FIG. 2 is a perspective view illustrating an integrated apparatus for testing image devices according to the present invention.

FIG. 1 is a block diagram illustrating an integrated apparatus for testing image devices according to the present invention, and FIG. 2 is a perspective view illustrating an integrated apparatus for testing image devices according to the present invention.

As shown in FIG. 1, an integrated apparatus for testing image devices according to the present invention comprises an image output circuit 10 for transmitting a video signal to an external side(receiving side), an image input circuit 11 for receiving a video signal from the transmission side, an image level circuit 12 for receiving a video signal from the transmission side and detecting a level of a corresponding signal, an illumination intensity measuring circuit 13 for measuring an intensity of light of the transmission side, a noise measuring circuit 14 for measuring a level of noise at a periphery of the transmission side, a UTP (Unshielded Twisted Pair) cable measuring circuit 15 for detecting a certain error based on a short circuit of a cable when it is needed to connect using the UTP, a communication test circuit 16 for testing whether a data communication between the transmission side and the receiving side is normally performed or not through a RS422 wired data transmission path, a text display circuit 17 for receiving a video signal from the transmission side through the image input circuit 11 and inserting a certain text data into a corresponding signal or detecting an inserted text data in accordance with a control signal or detecting an included text data and providing to the image output circuit 10, an A/D converter 18 for receiving the signals of the image level circuit 12, the illumination intensity measuring circuit 13, the noise measuring circuit 14 and the UTP cable measuring circuit and converting into a digital data, a TFT monitor 19 for displaying a text inserted through the text display circuit 17 or detected and a text generated in accordance with a control signal, which controls the text display circuit 17, a key pad 20 with which a worker or a user inputs a certain command or text, and a main controller 24 for checking and judging a certain error during a flow of a signal through the communication test circuit 16 based on a user's request inputted through the key pad 20, evaluating a detection signal inputted through the A/D converter 18 based on a previously set standard, and displaying a result of the test and other test states on the TFT monitor by controlling the text display circuit 17.

A battery 21, an adaptor power circuit 22 and a charge power circuit 23 belong to the power supply unit for normally driving the elements of the present invention. Since the above construction is known in the art, the descriptions of the same are omitted.

The image output circuit 10, the image input circuit 11 and the text display circuit 17 are used for both the NTSC and PAL methods, so that the above elements may be used irrespective of the TV display method.

The operations of the integrated apparatus for testing image devices according to the present invention will be described.

The testing method is classified into five modes. There are four testing sources measured through the A/D converter 18, and there is one testing method which tests a data transmission and receiving operation using the communication test circuit 16 based on a communication protocol.

The operation will be described based on the testing modes. In the case of an image measuring mode concerning an image among the testing sources measured through the A/D converter 18, the worker requests an image measurement through the key pad 20, and the main controller 24 receives a data measured by the image level circuit 12 through the A/D converter 18, the data being received in a digital form.

Here, the worker is a ready mode for allowing the image output circuit 10 and the image input circuit 11 to receive the signal from the transmission side and to transmit the same to the receiving side. Even in the course of the test, a transmission of a video signal is properly performed between the transmission side and the receiving side.

The main controller 24 receives a data measured by the image level circuit 12 through the A/D converter and displays the same on the TFT monitor 19 by controlling the text display circuit 17 and judges whether there is an error or not. At this time, a result of the judgment is also displayed on the TFT monitor 19.

The main controller 24 displays the OSD text on the TFT monitor 19 by controlling the text display circuit 17. Here, each function may be set on the menu using the key pad 20 and at the same time an unnecessary text may not be displayed when adjusting the input images using the OSD ON/OFF function.

An image output function is first enhanced with respect to the images transmitted based on a signal adjustment, and a video signal such as a color bar or focus chart is outputted, so that an error diagnosis of an image input device and an accurate color adjustment of a monitor may be obtained.

In the case of the CCTV, it is possible to measure a level value of a video output signal from the camera or other video output signals, the standard value is 100 IRE, so that it is possible to evaluate the quality with the above valve.

In addition, it is possible to check the communication state, low level of battery, etc. on the TFT monitor 19.

Since the test modes such as a noise measuring mode, an illumination intensity measuring mode and a UTP cable measuring mode using the sources different from the image sources among the test sources measured by the A/D converter 18 are same as the earlier described image measuring mode, the descriptions of the same are omitted. A test feature of a corresponding mode will be described in brief. In the illumination intensity mode, when an illumination intensity sensor is inputted into an illumination intensity sensor input terminal of a body, the illumination intensity of the current peripheral side is measured and displayed on the monitor. The above measured value may be a data with which it is possible to adjust the camera in an optimum state by checking the illumination intensity at a place in which the camera is currently recording.

In the noise measuring mode, a noise measuring microphone is connected with the body for thereby measuring a noise level at the current peripheral side and displaying on the monitor. At this time, the function of the noise measuring mode may be additionally used for the audio input and output operations. It is easy to manage the system with an audio device by integrating a microphone and speaker therein. The above function may be integrated without an additional cost.

The short circuit of the UTP cable is judged through the UTP cable measuring circuit 15. This operation will be omitted.

The communication test mode, in which it is tested whether a data communication between a transmission side and a receiving side is normally performed through the RS422 wired data transmission path, is classified into a receiving test mode and a transmission test mode. Since the receiving mode is the same as the earlier described mode, the descriptions of the same will be omitted.

The transmission test mode will be described as follows. In the transmission mode, a worker selects upper, lower, left, right TELE and WIDE signals based on the data transmission using the key pad, and the main controller 24 converts the communication code into a certain text form like "upper→conversion→upper signal output", "lower→conversion→lower signal output", "left→conversion→conversion→left signal output", "right→conversion→right signal output", "TELE→conversion→TELE signal output", or "WIDE→conversion→WIDE signal output. The thusly outputted texts are displayed on the TFT monitor 19.

In addition, in the transmission or receiving test mode, the data transmitted through the RS422 wired data transmission path allow the video signal to be transmitted to an external side(receiving side) through the image output circuit 10.

A PTZ control function, a cable test function or a RS-485 code display function may be added to the integrated apparatus for testing image device according to the present invention, so that it is possible to manufacture a product which is exclusively dedicated to a video engineer.

As described above, according to an integrated apparatus for testing image devices according to the present invention, a plurality of test devices needed for an installation of an image-related device are integrated into one apparatus for thereby enhancing a portability and a testing work efficiency of a tester as compared to the conventional art in which a conventional testing apparatus is provided with a plurality of devices such as a multi-meter, a portable monitor, a communication tester, etc.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An integrated apparatus for testing image devices having a transmission side and a receiving side, comprising:

an image level measuring means which is connected with a video signal path and receives a video signal from the transmission side of the image devices and detects a level of a corresponding video signal in the video signal path;

an A/D converter which converts a signal detected by the image level measuring means into a digital signal provided by in accordance with a control signal;

a communication test means which measures whether a data communication between the transmission side and the receiving side of the image devices is normally performed or not through a wired data transmission path;

a text display circuit which is connectable with the video signal path between the transmission side and the receiving side and inserts a certain text data into a corresponding signal in accordance with a text control signal or detects an inserted text data provided to an image input circuit:

a monitor which displays a text inserted or detected through the text display circuit or a text generated by the text control signal which controls the text display circuit;

a key pad with which a worker or a user inputs a certain command or a text; and a main controller which checks and judges a certain error during a flow of a signal through the communication test circuit based on a user's request inputted through the key pad, evaluates a detection signal inputted through the A/D converter based on a previously set standard, and displays a result of a test and other test states on the monitor by controlling the text display circuit.

2. The apparatus of claim 1, further comprising:

an illumination intensity measuring means which measures an intensity of light at a surrounding portion of the transmission side; and a noise measuring means which measures a level of a noise at a surrounding portion of the transmission side, a signal detected through the illumination intensity measuring means and the noise measuring means being converted into a digital signal by the A/D converter and being supplied in accordance with a noise measuring control signal.

3. The apparatus of claim 1, wherein a UTP (Unshielded Twisted Pair) cable measuring means is connected with a signal input side of the A/D converter for detecting an error based on a short circuit of a cable when it is needed to connect using a UTP.

4. The apparatus of claim 1, wherein said text display circuit is provided with a video signal input function and a video signal output function and is used for both the NTSC and PAL methods irrespective of a TV method.

5. The apparatus of claim 1, wherein said communication test means is designed to check a data transmission and receiving state based on a RS422 communication protocol.

\* \* \* \* \*